United States Patent
Jones

(10) Patent No.: US 10,043,190 B1
(45) Date of Patent: Aug. 7, 2018

(54) FRAUD DETECTION DATABASE

(71) Applicant: Wells Fargo Bank, N.A., San Francisco, CA (US)

(72) Inventor: Raymond F. Jones, Hopkins, MN (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 15/431,280

(22) Filed: Feb. 13, 2017

Related U.S. Application Data

(63) Continuation of application No. 14/221,590, filed on Mar. 21, 2014, now Pat. No. 9,607,620.

(51) Int. Cl.
| | |
|---|---|
| *G06Q 30/00* | (2012.01) |
| *G10L 17/22* | (2013.01) |
| *G10L 17/04* | (2013.01) |
| *G10L 17/06* | (2013.01) |
| *G10L 17/02* | (2013.01) |
| *G10L 17/26* | (2013.01) |

(52) U.S. Cl.
CPC .......... *G06Q 30/0185* (2013.01); *G10L 17/02* (2013.01); *G10L 17/04* (2013.01); *G10L 17/06* (2013.01); *G10L 17/22* (2013.01); *G10L 17/26* (2013.01)

(58) Field of Classification Search
CPC .......... H04M 2203/6027; H04W 12/12; G10L 17/26
See application file for complete search history.

(56) References Cited

U.S. PATENT DOCUMENTS

| | | | | |
|---|---|---|---|---|
| 5,623,539 | A | * 4/1997 | Bassenyemukasa | .... H04M 1/66 |
| | | | | 379/114.14 |
| 6,151,571 | A | * 11/2000 | Pertrushin | ............... G10L 17/26 |
| | | | | 704/207 |
| 6,480,825 | B1 | * 11/2002 | Sharma | .............. G07C 9/00158 |
| | | | | 704/270 |

(Continued)

OTHER PUBLICATIONS

Jonathan Camhi, NICE Uses Voice Recognition to Take Down Fraudsters Dialing Call Centers, Jan. 9, 2013, 2 pages.

(Continued)

*Primary Examiner* — Brian L Albertalli
(74) *Attorney, Agent, or Firm* — Walter | Haverfield LLP; James J. Pingor

(57) ABSTRACT

Embodiments of techniques or systems for fraud detection are provided herein. A communication may be received where the communication includes one or more voice signals from an individual. Frequency responses associated with these voice signals may be determined and analyzed and utilized to determine whether or not potential fraudulent activity is occurring. For example, if a frequency response is greater than a frequency threshold, potential fraudulent activity may be determined. Further, frequency responses may be cross referenced with voice biometrics, voice printing, or fraud pathway detection results. In this way, voice stress or frequency responses may be utilized to build other databases related to other types of fraud detection, thereby enhancing one or more aspects of fraud detection. For example, a database may include a voice library, a pathway library, or a frequency library which include characteristics associated with fraudulent activity, thereby facilitating identification of such activity.

18 Claims, 8 Drawing Sheets

(56) References Cited

U.S. PATENT DOCUMENTS

| | | | | | |
|---|---|---|---|---|---|
| 6,804,331 | B1* | 10/2004 | Vacek | ................... | H04M 3/38 |
| | | | | | 379/88.02 |
| 7,512,221 | B2 | 3/2009 | Toms | | |
| 7,664,641 | B1* | 2/2010 | Pettay | ................... | G10L 25/48 |
| | | | | | 704/246 |
| 7,974,395 | B2* | 7/2011 | Abramson | ........... | H04M 3/436 |
| | | | | | 379/114.14 |
| 8,204,884 | B2* | 6/2012 | Freedman | ............ | G06Q 30/06 |
| | | | | | 379/265.06 |
| 8,531,332 | B2* | 9/2013 | Gum | .................... | G01S 5/0215 |
| | | | | | 342/357.73 |
| 8,548,137 | B2* | 10/2013 | Zoldi | .................... | G06Q 40/00 |
| | | | | | 379/114.14 |
| 8,666,841 | B1* | 3/2014 | Claridge | ................ | G06Q 30/00 |
| | | | | | 705/26.1 |
| 9,472,194 | B2 | 10/2016 | Jones | | |
| 9,589,566 | B2 | 3/2017 | Jones | | |
| 9,607,620 | B2 | 3/2017 | Jones | | |
| 2002/0010587 | A1* | 1/2002 | Pertrushin | .............. | G10L 17/26 |
| | | | | | 704/275 |
| 2003/0023444 | A1* | 1/2003 | ST. John | .............. | H04M 3/382 |
| | | | | | 704/270.1 |
| 2003/0167153 | A1* | 9/2003 | Alexander | ......... | G06F 19/3418 |
| | | | | | 702/189 |
| 2004/0093218 | A1* | 5/2004 | Bezar | ..................... | G10L 17/26 |
| | | | | | 704/273 |
| 2005/0185779 | A1* | 8/2005 | Toms | ..................... | G10L 17/22 |
| | | | | | 379/114.14 |
| 2006/0206724 | A1* | 9/2006 | Schaufele | ............ | G06F 21/32 |
| | | | | | 713/186 |
| 2006/0262920 | A1* | 11/2006 | Conway | ............. | G10L 15/1822 |
| | | | | | 379/265.02 |
| 2006/0285665 | A1* | 12/2006 | Wasserblat | .............. | G10L 17/26 |
| | | | | | 379/114.14 |
| 2007/0071206 | A1* | 3/2007 | Gainsboro | .......... | H04M 3/2281 |
| | | | | | 379/168 |
| 2007/0255564 | A1* | 11/2007 | Yee | .......................... | G10L 17/24 |
| | | | | | 704/246 |
| 2007/0282605 | A1* | 12/2007 | Rajakumar | ........... | G06Q 20/24 |
| | | | | | 704/246 |
| 2008/0052259 | A1* | 2/2008 | Shiffman | ............... | G06N 5/025 |
| | | | | | 706/47 |
| 2008/0181379 | A1* | 7/2008 | Chow | ................. | H04L 63/0823 |
| | | | | | 379/142.05 |
| 2008/0195387 | A1* | 8/2008 | Zigel | ....................... | G10L 17/06 |
| | | | | | 704/236 |
| 2008/0249793 | A1* | 10/2008 | Angell | ................... | G06Q 30/02 |
| | | | | | 705/1.1 |
| 2008/0300877 | A1* | 12/2008 | Gilbert | .................... | G06Q 40/00 |
| | | | | | 704/246 |
| 2009/0076811 | A1* | 3/2009 | Ofek | ....................... | G10L 17/26 |
| | | | | | 704/231 |
| 2010/0106502 | A1* | 4/2010 | Farrell | ............... | G07C 9/00158 |
| | | | | | 704/246 |
| 2010/0228656 | A1* | 9/2010 | Wasserblat | ............. | G06Q 10/10 |
| | | | | | 705/35 |
| 2010/0303211 | A1* | 12/2010 | Hartig | .................... | G06Q 20/24 |
| | | | | | 379/1.01 |
| 2011/0135069 | A1* | 6/2011 | Yoshida | ............ | H04M 3/42221 |
| | | | | | 379/85 |
| 2011/0178803 | A1 | 7/2011 | Petrushin | | |
| 2011/0307257 | A1* | 12/2011 | Pereg | ................... | G06Q 10/063 |
| | | | | | 704/251 |
| 2012/0072453 | A1* | 3/2012 | Guerra | .................... | G10L 17/00 |
| | | | | | 707/776 |
| 2012/0134478 | A1* | 5/2012 | Broman | ............... | G06Q 20/341 |
| | | | | | 379/88.02 |
| 2012/0209598 | A1* | 8/2012 | Hayakawa | .............. | G10L 17/26 |
| | | | | | 704/207 |
| 2012/0254243 | A1* | 10/2012 | Zeppenfeld | ........... | H04M 15/47 |
| | | | | | 707/778 |
| 2012/0262296 | A1* | 10/2012 | Bezar | ...................... | G10L 17/26 |
| | | | | | 340/573.1 |
| 2012/0263285 | A1* | 10/2012 | Rajakumar | ............. | G10L 17/00 |
| | | | | | 379/189 |
| 2013/0082103 | A1* | 4/2013 | Aaron | .................... | G06Q 20/14 |
| | | | | | 235/380 |
| 2014/0136194 | A1* | 5/2014 | Warford | .................. | G10L 17/02 |
| | | | | | 704/233 |
| 2014/0169547 | A1* | 6/2014 | Murgai | ............... | H04M 3/5175 |
| | | | | | 379/265.03 |
| 2014/0254778 | A1* | 9/2014 | Zeppenfeld | ........... | H04M 3/523 |
| | | | | | 379/88.02 |
| 2014/0289867 | A1* | 9/2014 | Bukai | ................ | G06Q 20/4016 |
| | | | | | 726/28 |
| 2015/0142446 | A1* | 5/2015 | Gopinathan | ......... | G06Q 40/025 |
| | | | | | 704/270 |
| 2015/0195406 | A1* | 7/2015 | Dwyer | ................ | H04M 3/5175 |
| | | | | | 379/265.07 |

OTHER PUBLICATIONS

Nan Jiang, et al., Isolating and Analyzing Fraud Activities in a Large Cellular Network via Voice Call Graph Analysis, 2012, 14 pages.

Tracy Kitten, Voice Biometrics as a Fraud Fighter, May 22, 2012, 6 pages.

Leon Rothkrantz, et al., Voice Stress Analysis, Text, Speech and Dialogue. Springer Berlin/Heidelberg, 2004.

Igor Ruiz-Agundez, et al., Fraud Detection for Voice over IP Services on Next-Generation Networks, 2010, 199-212.

* cited by examiner

FRAUD DETECTION DATABASE

CROSS-REFERENCE TO RELATED APPLICATIONS

This application is a continuation of and claims priority to U.S. Non-Provisional patent application Ser. No. 14/221,590 entitled "FRAUD DETECTION", filed on Mar. 21, 2014. The entirety of the above-noted application is incorporated by reference herein.

BACKGROUND

Generally, voice stress may be utilized in an interview process where individuals are face to face with an interviewer. For example, an interview between an interviewer and an interviewee may be conducted in person. Voice stress may be employed or in use with various levels of federal, state, or local law enforcement, investigative units of public companies or private companies, domestic entities, foreign entities, etc. However, voice stress is generally limited to use in an in-person setting where a person conducting the interview is face to face with an individual being questioned or interrogated.

Perpetrators or fraudsters often phone in, call in, or initiate communications with institutions, such as financial institutions to steal personal information or financial information from a victim, account owner, etc. Effectively, fraudsters (e.g., someone other than an authorized user, legitimate customer, or account owner) may falsify or misrepresent data for the purpose of effecting one or more actions for an account associated with an account owner by impersonating, posing, or acting as the individual purported to be the owner of the account or account owner. Accordingly, if the perpetrators or fraudsters are not caught, fraud by deception may occur when a fraudster calls into a call center and passes security verification, thereby proceeding with one or more fraudulent actions.

Fraudulent actions may include actions for an account takeover (ATO), falsifying or misrepresenting information related to account ownership, misrepresentation of assets, misrepresentation of a relationship, misrepresentation of use of an account, misrepresentation of the caller as an employee of a trusted organization (e.g., a financial institution, etc.), misrepresenting a legitimate use or need for information or actions requested, identity theft, identity fraud, fraudulent application for financial instrument (e.g., credit card), etc.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for fraud detection are provided herein. A communication may be received which includes one or more segments with one or more voice signals of an individual. One or more of the voice signals may be analyzed for one or more frequency responses (e.g., the frequency at which the individual's vocal cords vibrate during a segment of the communication). It may be determined whether the individual is attempting fraudulent activity based on a comparison between one or more of the frequency responses and a frequency threshold or a comparison between two or more of the frequency responses.

In one or more embodiments, fraud detection may be implemented by utilizing voice biometrics, voice printing, etc. For example, a database may include a voice library which includes one or more voice signals from individuals deemed to be fraudsters. To this end, one or more of the voice signals from the communication may be compared against one or more of the voice signals from the voice library to determine whether or not a match exists. When a match exists, actions may be taken to mitigate losses, an account takeover (ATO), or potentially fraudulent actions.

Additionally, fraud pathway detection may be implemented by detecting or determining one or more characteristics associated with a communication. For example, characteristics associated with the communication may be indicative of a technology associated with a communication, artifacts associated with the communication, or noise associated with the communication. One or more of the characteristics associated with the communication may be utilized to generate reverse lookup data or reverse path data for the communication. In other words, information about the caller, individual, communication, etc. may be determined or traced based on available information. For example, a reverse lookup for a call placed through a voice over internet protocol (VoIP) channel may be resolved by determining an internet protocol (IP) address for a corresponding domain. One or more of these characteristics may be compared with one or more sets of characteristics in a pathway library. The pathway library may include one or more sets of characteristics which are deemed to be associated with fraudulent communication. To this end, when a match occurs, action may be taken to mitigate losses or potential fraudulent activity.

In one or more embodiments, voice stress analysis (VSA) may be implemented to determine whether a communication is fraudulent or not. For example, different segments of a communication may be examined or analyzed to determine whether or not a frequency discrepancy exists between two or more segments of the communication. In one or more embodiments, a frequency determination which indicates potential fraudulent activity may be generated when one or more segments of the communication is associated with a frequency which is greater than a frequency threshold, for example.

As an example, a first segment of the communication may include a conversation segment which may include one or more requests associated with an account (e.g., access to the account, changes to the account, actions to be taken, etc.). A second segment of the communication may include a verification segment, which may include one or more security questions, one or more stress questions, one or more test questions, and one or more responses thereto. It may be expected that an individual who is a fraudster may respond with one or more responses associated with a higher frequency responses to the stress questions, test questions, security questions, etc. due to the risk of being detected, exposed, etc. Because of this, voice stress may be applied to a live communication or a recorded communication to determine whether a transaction initiated by an individual is fraudulent.

One or more database libraries (e.g., a voice library, a frequency library, a pathway library, etc.) may be updated when disparities occur between different comparisons. For example, when VSA is implemented and it is determined that an individual may be conducting a fraudulent transaction based on a frequency response (e.g., greater than a frequency threshold), the voice library may be updated with one or more voice signals or one or more voice samples from the communication to supplement one or more existing voice samples or to create a new identity or profile for a new fraudster. In this way, one or more of voice biometrics, pathway analysis, or VSA may be utilized to cross-reference, cross-check, sharpen, or enhance one or more of the other two.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
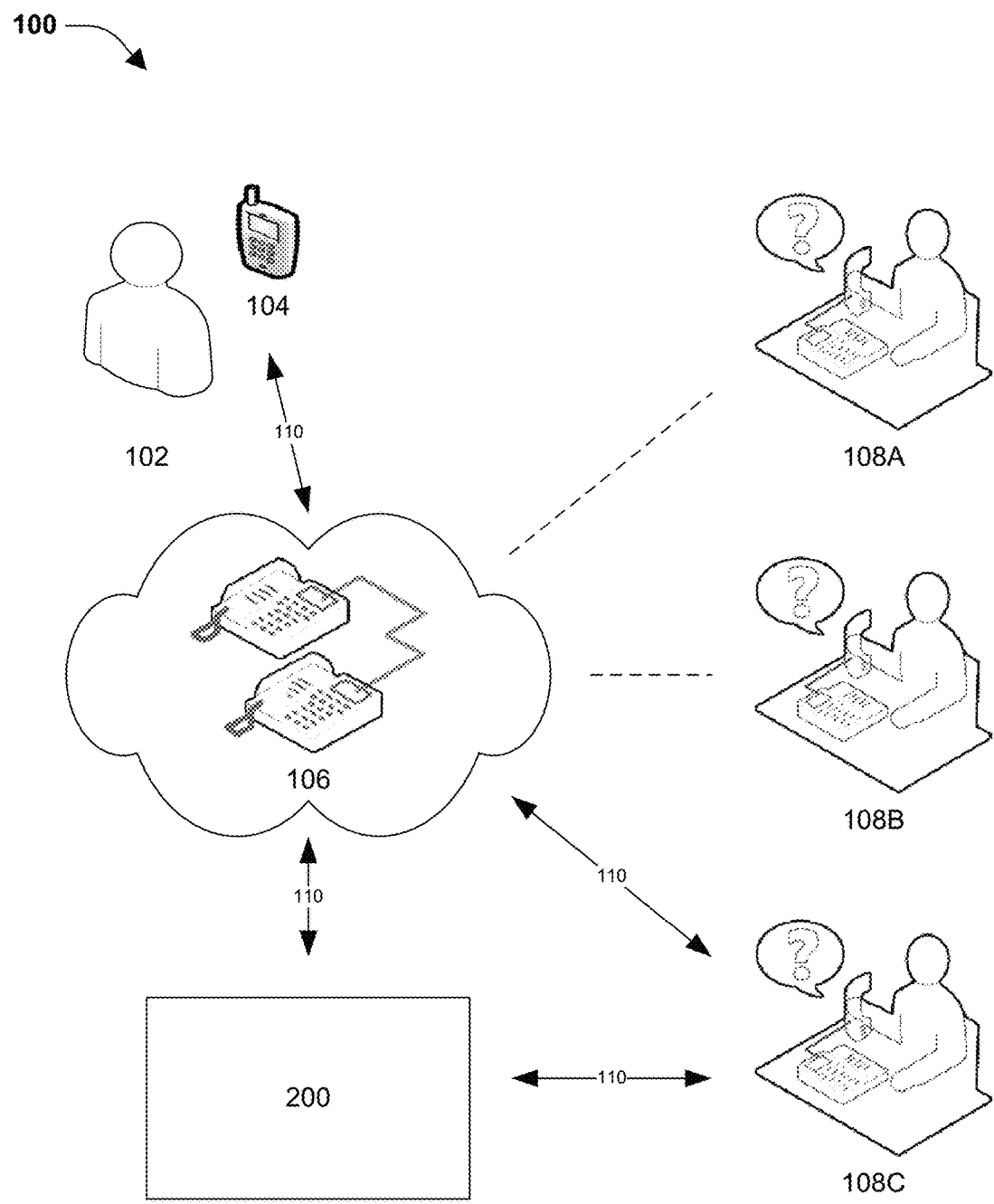
FIG. 1 is an illustration of an example application of a system for fraud detection, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 8:
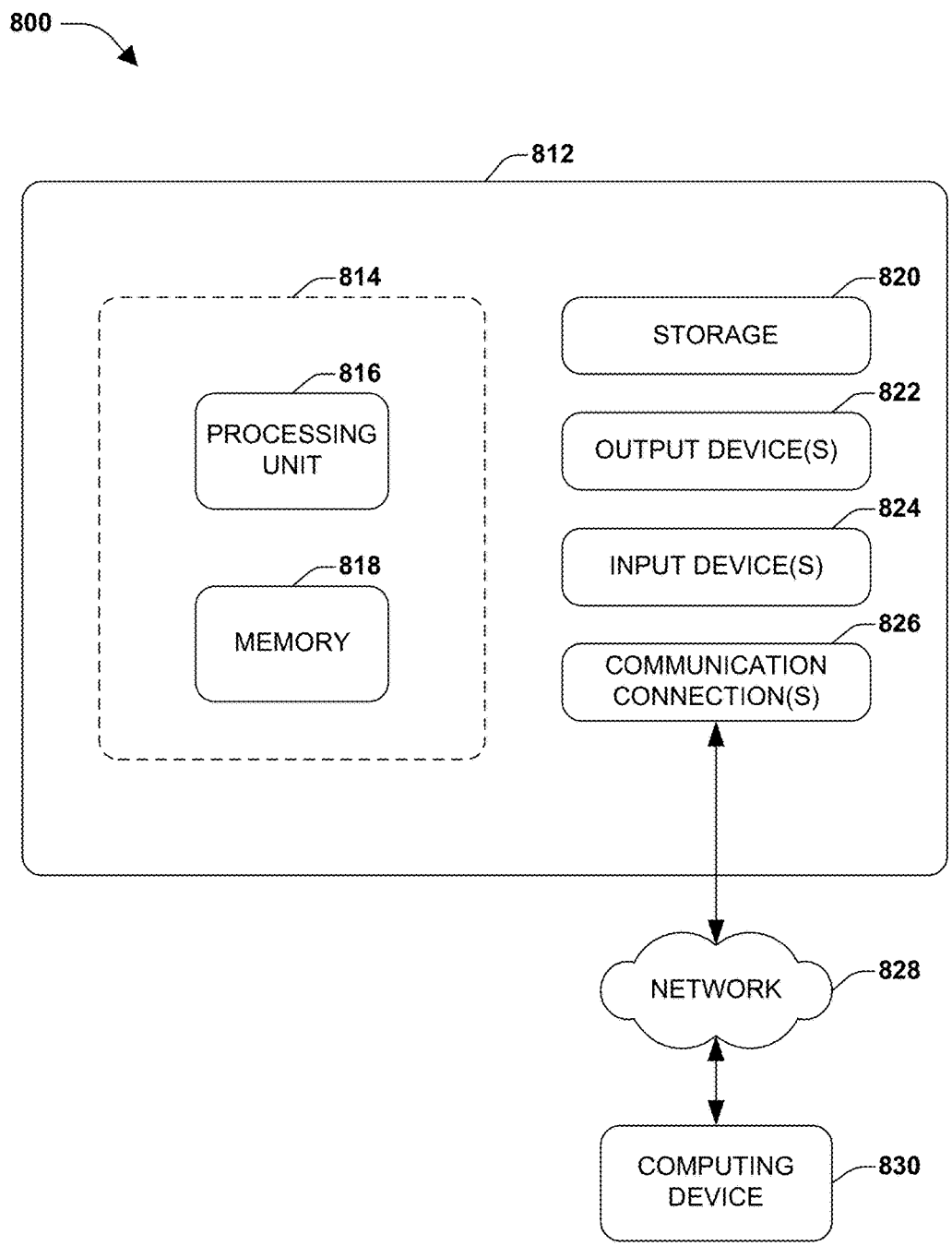
FIG. 8 is an illustration of an example computing environment where one or more of the provisions set forth herein are implemented, according to one or more embodiments.

For one or more of the figures herein, one or more boundaries, such as boundary 814 of FIG. 8, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

As used herein, the term to "infer" or "inference" refer generally to the process of reasoning about or inferring states of the system, environment, and/or user from a set of observations as captured via events and/or data. Inference may be employed to identify a specific context or action, or may generate a probability distribution over states, for example. The inference may be probabilistic. The computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

One or more aspects may employ various Al-based schemes for carrying out various aspects thereof. For example, a process or system may be facilitated via utilization of an automatic classifier. For example, when a conversation segment is determined, a classifier may be employed to facilitate such a determination. A classifier may be a function that maps an input attribute vector, $x=(x1, x2, x3, x4, xn)$, to a confidence that the input belongs to a class, that is, $f(x)$=confidence (class). Such classification may employ a probabilistic and/or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence may be employed. Classification as used herein also is inclusive of statistical regression that is utilized to develop models of priority.

As will be readily appreciated from the subject specification, one or more embodiments may employ classifiers that are explicitly trained (e.g., via a generic training data) as well as implicitly trained (e.g., via observing user behavior, receiving extrinsic information). For example, SVMs may be configured via a learning or training phase within a classifier constructor and feature selection module. Thus, the classifier(s) may be used to automatically learn and perform a number of functions, including but not limited to determining according to a predetermined criteria.

FIG. 1 is an illustration of an example application 100 of a system for fraud detection, according to one or more embodiments. Accordingly, one or more embodiments of techniques or systems for fraud detection, enhanced, fraud detection, or updating associated databases or libraries are provided herein. As an example, a communication 110 may be received from an individual 102. A communication 110 may include a call, a telephone call, a phone conversation, a conversation, one or more voice signals, one or more voice signatures, one or more audio signals, one or more audio signatures, a transaction, voice communications, multimedia content, etc. Further, a communication 110 may be a communication initiated by an individual which is inbound (e.g., incoming as to a call center, for example) or outbound (e.g., when a call center offers a callback service, etc.). Additionally, a communication 110 may include a conversation between one or more individuals, one or more entities, one or more parties, a caller and a recipient of a call, etc.

It will be appreciated that an individual 102 may utilize one or more different types of devices to communicate. For example, the individual may utilize a mobile device 104 to facilitate communication. In one or more embodiments, the communication 110 may be implemented across different channels, such as a voice over internet protocol (VoIP) channel, telephony, one or more telecommunication channels 106, a landline, a mobile line, satellite communications, or otherwise transmit voice data between two or more parties (e.g., the individual 102 and another party, such as CSR 108C). It will be appreciated that the communication may include aspects from the individual 102 with relation to a telecommunication channel 106 or from a party (e.g., CSR 108C) to telecommunication channel 106.

Generally, one or more of the voice signals or voice signatures of a communication 110 is of an individual who has at one time or another initiated a communication 110 or a request with an institution, such as a financial institution, bank, etc. In one or more scenarios, one or more additional voice signals of a communication 110 may be from a representative, such as a customer service representative (CSR) 108A, 108B, or 108C, for example. In other scenarios, the communication 110 may be between the individual and an interactive voice response (IVR) system where there may be no need for CSR 108A, 108B, or 108C. Here, in these scenarios, the communication 110 may merely include voice signals of the individual (e.g., and/or voice signals of pre-recorded prompts from the IVR, etc.), for example.

In one or more embodiments, one or more aspects or one or more characteristics of the communication 110 may be received by a system for fraud detection 200 which may utilize one or more portions of the communication to facilitate fraud detection. For example, one or more voice responses from one or more segments of the communication may be segmented, divided, or analyzed. In one or more embodiments, frequency responses for one or more of the segments may be analyzed to determine whether or not potential fraudulent activity is occurring. This analysis may be based on whether one or more of the frequency responses exceeds (or is below) a frequency threshold or whether a delta frequency between two or more of the frequency responses is greater than a delta frequency threshold.

Additionally, the system 200 may supplement the frequency response analysis or the VSA with voice biometrics or fraud pathway detection, which will be described in greater detail herein. According to one or more aspects, one or more databases or libraries (e.g., associated with the system 200) may be updated according to one or more aspects or characteristics of the communication 110 to enhance fraud detection or cross-reference one or more different types of fraud detection.

Figure 2:
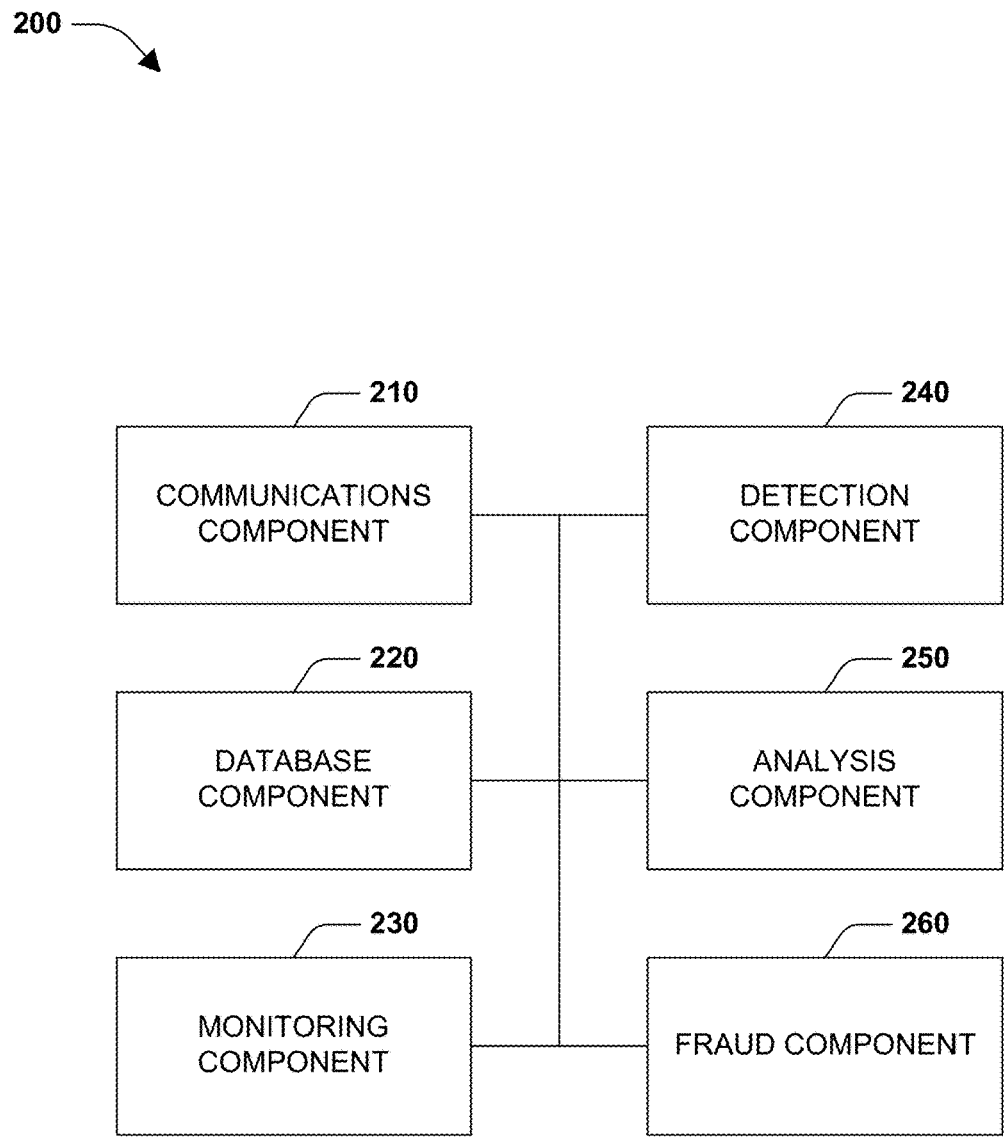
FIG. 2 is an illustration of an example system for fraud detection, according to one or more embodiments.

FIG. 2 is an illustration of an example system 200 for fraud detection, according to one or more embodiments. The system 200 may include a communications component 210, a database component 220, a monitoring component 230, a detection component 240, an analysis component 250, and a fraud component 260. However, it will be appreciated that according to one or more aspects, the system 200 may be implemented or practiced without one or more of the components.

In one or more embodiments, the communications component 210 may be utilized to initiate or receive a communication (e.g., 110 of FIG. 1). The monitoring component 230 may receive one or more portions or one or more segments of a communication. For example, a communication may include one or more portions or one or more segments. A segment of one or more of the segments may be an exchange between a caller, an individual (who may be a fraudster or a legitimate account owner) and a recipient of the call, receiver, customer service representative (CSR), call center representative, employee, etc. Generally, a segment may include one or more voice signals associated with an individual (e.g., the individual calling into the institution). Often, a segment may also include one or more additional voice signals associated with a second individual (e.g., CSR, employee, etc.).

The monitoring component 230 may record or identify one or more segments of a communication. For example, the monitoring component 230 may identify, determine, or tag one or more segments of a communication or a call as a salutation segment, a verification segment, a conversation segment, a summary segment, etc. As an example, a communication may include a salutation segment, a verification, a conversation segment, or a summary segment. The salutation segment may include an introduction, a customary greeting, a greeting, or a brief identification (e.g., "Hello, my name is Mike"). Further, the salutation segment may be at the beginning of a communication.

A communication may include a verification segment. Often verification segments may be identified as including one or more security questions, one or more stress questions, one or more test questions, etc. where security information (e.g., financial information, personal information, etc.) may be requested from the individual who is communicating with the institution (e.g., financial institution, bank, etc.). As an example, the verification segment may include a request for an account number, a social security number (SSN), the last four digits of a SSN, a name on the account, authorized users on the account, an address, a home telephone number, a business telephone number, mother's maiden name, date of birth (DOB), card verification data (CVD), a card verification number (CVN), card verification value (CVV) or (CVV2), card verification value code (CWC), card verification code (CVC) or (CVC2), verification code (V-code), card code verification (CCV), signature panel code (SPC), one or more out of wallet verification questions, knowledge based authentication, etc.

Regardless, one or more of the security questions, stress questions, or test questions may be designed to invoke an expected stress response or frequency response when an individual providing the response is a fraudster or perpetrator. For example, the monitoring component 230 may provide a CSR with one or more test questions or security questions deemed to invoke a more pronounced stress response or frequency response based on a pre-determined pattern or based on experimentation. In other words, out of a pool of many stress questions or test questions, the monitoring component 230 may suggest one or more of the stress questions or test questions associated with higher stress responses from individuals which are not authorized account owners. Stated another way, the monitoring component 230 may provide stress questions which have elicited a desired response from individuals known not to be the account owners during a training period or an experimental period, for example.

A communication may include a conversation segment, which may include one or more requests associated with an account of an account owner. When the individual who is calling in or participating in a communication with an institution is a fraudster or a perpetrator, one or more of the requests may include requests for fraudulent activity or potential fraudulent activity. It will be appreciated that an individual may be a legitimate account owner, a legitimate user, or a legitimate customer. However, individuals who are fraudsters, perpetrators, impersonators, etc. may call in posing as an account owner, legitimate customer, etc. A request associated with the conversation segment may be indicative of one or more goals which an individual desired to achieve or accomplish. Accordingly, a conversation segment of a communication may include one or more voice signals of an individual who is making one or more requests associated with an account.

For example, an individual (e.g., not necessarily a fraudster) may submit a request for one or more actions, such as a change of address, to add or remove an address from an account, to use an alternate address (e.g., business address), order a replacement card, add or change authorized users to the account, notify a card issuer or account manager that they have purchase plans (e.g., "I plan on making several large purchases over $X") or travel plans (e.g., "I plan on travelling to Italy"), confirming a previously made order, mail or telephone order, internet order, verify transactions, request emergency funds, transfer funds between accounts, request a balance transfer, make an account inquiry, report an account lost or stolen, etc. Sometimes, fraudsters may 'test' an account by making a general or balance inquiry. Generally, the conversation segment may be designed to mitigate invoking of stress responses or frequency responses such that an individual who is a fraudster will respond with a response associated with a 'normal' or 'expected' frequency response (e.g., within a frequency tolerance range or such that the response does not exceed a frequency threshold, etc.).

A summary segment of a communication may include a summary of one or more requests, changes, actions to be taken, etc. An operator, CSR, or IVR may ask a caller or an individual if there is anything else the caller or individual needs help with, offer additional assistance, additional products, etc. To this end a segment of one or more of the segments of a communication may include one or more questions, one or more answers, one or more responses, one or more question-answer portions, one or more statements, one or more response statements, etc. Further, it will be appreciated that one or more of the segments may be associated with an expected stress response or expected frequency response.

For example, the verification segment may be associated with an expected slightly elevated frequency response in comparison with one or more other segments of the communication due to the design of one or more of the test questions or stress questions. On the other hand, the conversation segment, the introduction segment, or the summary segment may be associated with a normal or baseline expected frequency response. In other words, less stress, 'normal' frequency responses, or lower frequency responses may be expected for these segments. Regardless, the monitoring component 230 may receive, record, or categorize a communication, one or more segments of a communication, one or more responses, one or more statements, one or more voice signals associated therewith, etc. made by an individual (e.g., where the individual may be a legitimate account owner or an individual posing as the account owner or a fraudster).

The monitoring component 230 may categorize one or more segments of the communication or one or more responses or statements associated with one or more segments of the communication. In other words, the monitoring component 230 may, for example, tag one or more segments or one or more portions of a communication or otherwise associate an expected frequency response with one or more of the segments. For example, the monitoring component 230 may identify one or more portions or one or more segments of a communication or conversation as an introduction segment, a conversation segment, a verification segment, a summary segment, or other type of segment. Additionally, the monitoring component 230 may associate these segments or portions of the communication with one or more expected characteristics or expected frequency responses. For example, when the monitoring component 230 identifies content associated with one or more voice signals as introductory (e.g., hi, how are you doing, etc.), the monitoring component 230 may tag or associate this segment with an expected frequency response threshold. In this example, the expected frequency response threshold may be higher, lower, or different than an expected frequency response threshold for a verification segment.

The monitoring component 230 may tag one or more segments of a communication as a type of segment or with an expected frequency response based on a rhythm associated with the communication, a party which is speaking, one or more procedures or practices of an institution, a user input, one or more patterns or speech patterns, a predetermined amount of time, a length of time associated with a continuous voice signal, voice inflection, etc. Further, the monitoring component 230 may isolate one or more of the voice signals from one or more segments of the communication (e.g., by applying one or more filters, performing signal analysis, etc.). In this way, noise may be filtered from one or more segments of the communication or one or more portions of the communication.

In one or more embodiments, the monitoring component 230 may employ voice biometrics or voice printing by comprising one or more voice signals from a communication or one or more segments of a communication against one or more voice signals or voice signatures in a voice library or voice database of individuals deemed to fraudsters, as will be discussed herein. The monitoring component 230 may generate a voice match determination based on a comparison between one or more of the voice signals of the communication and one or more voice signals, voice samples, etc. from the voice library. In other words, the monitoring component 230 may scan a voice library of the database component 220 to determine if a communication is associated with an individual who has a voice matched to a fraud library or voice library.

For example, a voice match determination may be indicative of whether or not it is believed that an individual is a same individual from the voice library who has been deemed as a fraudster. In one or more embodiments, the voice match determination may include a confidence level which indicates a likelihood that the individual is the same individual (e.g., associated with other fraudulent activity or suspected of fraudulent activity) as indicated by the voice library. The monitoring component 230 may scan a communication or a call for known fraud voice signatures utilizing voice biometrics or voice print technology in this manner. Additionally, one or more of the voice signals from the communication may be utilized to build or supplement a voice library, voice database, or voice print database, such as when fraudulent activity occurs or is confirmed after the fact (e.g., at a later time after an individual has called in or when fraud occurs where it is suspected that the individual associated with the communication is associated with compromising an account).

In one or more embodiments, the monitoring component 230 may facilitate administration of one or more test questions, one or more security questions, control a flow of the conversation, structure a communication, order of one or more segments of a communication, etc. In a scenario where an individual is providing responses to questions in an interactive voice response (IVR) system, the monitoring component 230 may playback one or more recordings or one or more recorded test questions or one or more stress questions as well as receiving or recording one or more corresponding responses. Further, one or more segments of a communication or responses taken from an IVR may be associated with different expected frequency response thresholds than responses to stress questions from a live person. For example, it may be expected that an individual posing as an account owner may experience a higher amount of stress (and thus respond with or have a higher frequency response) when responding to questions from a live person than when responding to questions from an automated or recorded system.

Additionally, the monitoring component 230 may facilitate or provide a structure for the communication by controlling an order of one or more segments of the communication. In one or more embodiments, the monitoring component 230 may control the flow or the structure of the communication such that a segment associated with an expected stress frequency response (e.g., a higher frequency or a greater than a frequency threshold) occurs prior to a segment associated with a normal or baseline frequency response. For example, the monitoring component 230 may facilitate asking a test question or a verification segment of a conversation or communication (e.g., and recording a corresponding response) prior to asking for a desired action or engaging in the conversation segment of the conversation or communication. Here, in this example, a 'stress' response may be expected prior to or before receiving the 'normal' response.

The monitoring component 230 may direct an operator, representative, or customer service representative (CSR) to ask these questions by providing the operator or recipient of the call with prompts. To this end, the monitoring component 230 may segment or identify one or more segments of a communication based on these prompts. For example, the monitoring component 230 may provide an operator or representative with one or more prompts which direct the representative to make statements, ask questions, ask stress questions, etc. As a result, an operator may ask for security information from an individual prior to asking the individual for their objectives. However, in other embodiments, the monitoring component 230 may direct the operator or representative to order one or more segments of the communication according to most any order. Accordingly, the monitoring component 230 may structure the communication or one or more segments of the communication based on a predetermined pattern or a random pattern. Regardless, the monitoring component 230 may thus receive or record voice signals or audio of a conversation, communication, or one or more portions or segments thereof.

Accordingly, the system 200 of FIG. 2 may provide fraud detection or enhanced fraud detection by utilizing voice biometrics, pathway detection, voice stress analysis, etc. in a manner such that one or more of the foregoing may be utilized to cross-reference, strengthen, enhance, or sharpen one or more of the others. In this way, a broad range of fraud detection may be achieved and fraudulent activity, potential fraudulent activity, fraudsters, perpetrators, fraud signatures, etc. may be detected (e.g., an mitigating action may be taken) among a group or plurality of communications, calls, telephone calls, phone calls, telecommunications, etc. By providing such fraud detection, operators, representatives, or customer service representatives may receive notifications which facilitate identification of fraudulent communications among one or more communications, a plurality of communications, or a mass of incoming calls, etc.

In one or more embodiments, the detection component 240 may be utilized by the system 200 to determine a pathway, communication pathway, fraud pathway, phone print, or one or more characteristics or attributes associated with a communication. For example, an attribute or characteristic of one or more of the characteristics associated with a communication may be indicative of a technology associated with the communication or a technology utilized to initiate the communication (e.g., whether a communication was placed over a telecommunications channel, a phone line, a voice over internet protocol or VoIP channel, etc.).

The detection component 240 may trace a technology or a route associated with a communication. In other words, the detection component 240 may determine the technology utilized to initiate the communication or a route associated with voice data or data transmission (e.g., a cellular network or cell tower, satellite transmission, trans-ocean cable, etc.). Additionally, the detection component 240 may determine whether one or more characteristics of a communication are being spoofed, associated with fraudulent activity or potential fraudulent activity. For example, one or more characteristics of a communication may include an origin location associated with the communication, a type of device utilized to initiate the communication, a communication channel, etc. The detection component 240 may determine whether a communication originates from a mobile device, cellular phone, landline, utilizes satellites, a telecommunications cable, etc.

Additionally, the detection component 240 may determine or detect one or more artifacts associated with the communication or noise associated with the communication. In one or more embodiments, the detection component 240 may sample one or more portions of a communication which is associated with no voice signals (e.g., when no individuals are talking or speaking or "silence" as to one or more of the individuals). The detection component 240 may identify one or more artifacts during these portions of the communication and determine one or more characteristics associated with the communication pathway (e.g., a call pathway) based on one or more of the artifacts during a period of "silence". An artifact may include one or more characteristics associated with a communication, such as noise, background noise, ambient noise, ambient sounds, static, or other background audio.

In some scenarios, noise or artifacts may be introduced intentionally by an individual, a party, or an entity to facilitate deception. Perpetrators or fraudsters may introduce noise purposely or intentionally in an attempt to defeat voice biometrics or voice printing. In other scenarios, noise may be inadvertently introduced, such as when the noise is introduced as a result of the channel or pathway being utilized for communication. For example, communications or calls placed over a voice over internet protocol (VoIP) service may often include undesirable noise or artifacts. To this end, the detection component 240 may identify or utilize one or more of these artifacts to determine an origin or pathway associated with the communication initiated via the VoIP service or channel.

The detection component 240 may compare one or more characteristics associated with the communication with one or more sets of characteristics in a pathway library (e.g. of the database component 220). In other words, the detection component 240 may scan a pathway library of the database component 220 to determine if a communication is associated with a fraud pathway or known fraud pathway matched to the pathway library. To this end, the detection component 240 may generate a pathway match determination. The pathway match determination may be generated based on a match between one or more of the characteristics of the communication and one or more of the sets of characteristics in the pathway library. The pathway library or pathway database may include one or more sets of characteristics deemed to be indicative of a fraudulent pathway. For example, if a fraudster has called in previously using a VoIP channel which is identified as an instrument which facilitated fraudulent action on the fraudster's behalf, traits or characteristics associated with that VoIP channel may be stored or recorded in the pathway library for future reference. Accordingly, heightened scrutiny, a notification, or an alert may be provided if the same VoIP channel is later utilized and/or an individual is requesting activity which could potentially facilitate fraud (e.g., authorization of card or account use in a foreign location or an unusual location, etc.).

In one or more embodiments, the analysis component 250 may be utilized to implement voice stress analysis (VSA) to a communication which occurs over a telecommunications channel, such as a phone line, over a mobile device, a voice over internet protocol (VoIP) channel. Generally, the analysis component 250 may apply the VSA to a communication or conversation where the communication is between an individual calling in (e.g., a caller) and an individual receiving the call (e.g., a call recipient). However, it will be appreciated that the analysis component 250 may implement VSA in scenarios where the individual or caller is the only participant on the line, such as when VSA is implemented in an interactive voice response (IVR) system. Regardless, it will be appreciated that VSA or stress analysis may be implemented in scenarios where the VSA or stress analysis is being applied to a telecommunication or communication, such as a telephone call, rather than in a face to face environment.

Returning to the scenario where a caller or an individual is calling and an operator or representative responds (e.g., individual-representative, individual-operator, or caller-recipient scenario), VSA may be applied by the analysis component 250 via an interviewer-interviewee format. For example, the analysis component 250 or the monitoring component 230 may prompt an operator or representative to ask one or more security questions or guide the operator. It will be appreciated that an individual or caller may potentially be an account owner or authorized user who should be granted access to a corresponding account or a fraudster, perpetrator, impersonator, etc., who should not be granted access. To this end the analysis component 250 may implement or utilize VSA in a call center application or a customer service center, etc. For example, the recipient of a call or communication may be an employee, a bank employee, a customer service representative (CSR), agent of a financial institution, etc. In this way, the analysis component 250 may utilize VSA in a banking context or for fraud detection in a financial environment.

The analysis component 250 may analyze one or more responses to one or more security questions or one or more stress questions. These responses may be associated with different segments of a communication, such as an introduction segment, a conversation segment, a verification segment, or a summary segment. Additionally, the responses may include voice signals from one or more individuals (e.g., individuals of interest associated with an unknown identity). For example, although a communication or one or more segments of a communication may include voice signals associated with an operator or a representative, voice signals associated with an individual may be of interest.

The analysis component 250 may analyze one or more frequency responses based on voice stress analysis by determining and/or comparing frequency responses of one or more segments of a communication. Generally, VSA includes a series of one or more baseline questions and a series of one or more 'test' questions, 'stress' questions, or security questions. Baseline questions are questions which an individual is not expected to lie about (e.g., what is your name, what is your address, etc.). The 'test' questions are questions where an individual has a possibility or likelihood of lying when responding to the question.

Because voice quality or frequency may change or be affected when an individual is under stress or pressure (e.g., engaging in fraudulent activity), the analysis component 250 may detect tensing of vocal cords of an individual by measuring the response or frequency response associated with different portions or segments of a conversation or a communication. The analysis component 250 may determine one or more frequency responses for one or more corresponding segments of a communication (e.g., provide an average frequency response, highs, lows, etc. for respective segments) or for one or more voice signals of the communications.

The analysis component 250 may facilitate determining whether a response from an individual (e.g., response to a security question) falls within an acceptable range of frequencies (e.g., exceeds a frequency threshold or within a frequency range). In other words, the analysis component 250 may measure psychophysiological stress responses of an individuals to a stimulus (e.g., test question, security question, verification of identity, etc.). In one or more embodiments, the analysis component 250 may analyze one or more portions of a communication or a call by segment. For example, the analysis component 250 may determine one or more expected frequency responses for a salutation segment, a verification segment, a conversation segment, a summary segment, other segments or portions of a communication or call.

In this way, the analysis component 250 may analyze a voice or voice signal of an individual or entity to identify deception within a conversation, such as a phone conversation, for example. The analysis component 250 may analyze a voice signal from a communication or conversation and determine one or more frequencies or frequency responses associated with the voice signal. For example, a frequency associated with a voice signal may be indicative of the frequency at which vocal chords of an individual vibrate. To this end, the analysis component 250 may estimate stress of a caller, entity, or individual by analyzing a vibration rate associated with vocal cords of the individual.

In one or more embodiments, the analysis component 250 may analyze one or more frequency responses for one or more segments of a communication. Further, the analysis component 250 may generate a frequency determination based on the analysis of one or more of the frequency responses. The frequency determination may be generated based on a comparison between one or more of the frequency responses and a frequency threshold. As an example, the analysis component 250 may analyze one or more segments of a communication and compare one or more segments against one or more expected frequency responses. For example, little or no stress is generally expected during an introduction segment of a communication. If the analysis component 250 notes high frequency response greater than a frequency threshold associated with a 'normal' or baseline response, then a corresponding frequency determination may be generated by the analysis component 250.

Similarly, if a verification segment of a communication is recorded and a frequency response greater than a frequency response threshold is noted by the analysis component 250, a frequency determination may be generated which indicates that an abnormal response was received, such as during the security questions. In one or more embodiments, this scenario (e.g., a frequency response outside of an acceptable range during a verification segment) may be considered more significant or weighted more heavily than a frequency response which is outside of an acceptable range for an introduction segment of a communication.

In other embodiments, the analysis component 250 may compare two or more frequency responses for two or more segments of the communication. For example, if a delta or difference between two or more of the frequency responses is greater than a delta frequency response threshold, the analysis component 250 may generate a frequency determination which indicate that the individual may be engaging in fraudulent activity. In other words, the analysis component 250 may compare two or more of the frequency responses based on a delta frequency threshold. Stated yet another way, the analysis component 250 may generate the frequency determination based on a comparison between one or more of the frequency responses of one or more of the segments of the communication and one or more other frequency responses of one or more other segments of the communication. For example, the analysis component 250 may utilize one or more of the voice signals of an individual from the salutation segment, summary segment, or conversation segment as a baseline for generating the frequency determination and compare the baseline with frequencies from the verification segment of the communication.

In one or more embodiments, the analysis component 250 may compare one or more measured frequencies (e.g., associated with different portions of a conversation or a communication) with one or more expected frequencies or expected frequency responses (e.g., assigned by the monitoring component 230 or from a frequency library of the database component 220). In other words, the analysis component 240 may scan a frequency library of the database component 220 to determine if an individual on a communication is speaking according to a range provided by the frequency library. In other embodiments, the analysis component 250 may identify a caller or individual as a potential fraudster when one or more portions or segments of a communication or conversation have frequencies which exceed a frequency threshold, for example. The analysis component 250 may analyze one or more portions or segments of a communication and generate a histogram of frequencies, a frequency delta, or a stress to non-stress ratio for one or more of the segments or across the communication, etc. To this end, the analysis component 250 may detect or analyze communications and identify communications (e.g., or portions or segments thereof) associated with a stress to non-stress segment ratio which exceeds a predetermined threshold.

The analysis component 250 may assign a segment of a conversation or communication which is associated with a request, a desire, a goal, a desired action, etc. as a baseline. In one or more embodiments, the analysis component 250 may utilize the conversation segment of a communication as a baseline. In other words, the analysis component 250 may utilize frequency responses associated with the conversation segment of a communication as an indicator of when a speaker or individual is not stressed, not lying, speaking at a lower range of frequencies, or otherwise at a normal stress level, baseline stress level, etc. In these conversation segments, it may be presumed or assumed that that the caller or individual is conversing or making statements with regards to their goals or what they desire to achieve. Because of this, the conversation segment may be associated with a normal, near normal, substantially normal, baseline level of stress, frequency response, etc.

Conversely, for the verification segment of a communication, the analysis component 250 may utilize corresponding frequency responses as segments to compare against baseline readings. In other words, the verification segment of a communication may be utilized as a test, by determining whether a frequency response associated with the verification segment has a higher frequency than the conversation segment. Here, during the verification segment of a communication, a higher stress level or frequency response may be expected. Because a fraudster is answering questions or test questions as if they were an account owner or authorized user, a higher frequency response may be expected (e.g., due to the risk of being detected, the thrill of success, an internal mental process associated with answering questions under an "assumed identity", speaking a language which is not their birth language, etc.). Based on the frequency, the analysis component 250 may calculate a stress level for one or more segments of a communication or intervene or take action based on the stress level.

In one or more embodiments, the analysis component 250 may identify a caller or an individual as legitimate even if one or more portions of a communication are associated with frequencies which exceed a frequency threshold based on one or more characteristics associated with the individual or one or more characteristics associated with a segment of a communication. For example, if an account owner (who has previously called in repeatedly) often speaks with a high frequency, his or her account may be tagged or identified such that a higher frequency or a frequency range is to be expected when the account owner calls in. Here, a frequency library (e.g., of a database component 220) may be updated to indicate a range of frequencies at which an account owner generally speaks.

As another example, if a 'test' question or security question often triggers account owners to exhibit higher frequency responses than other security questions, that 'test question' or security question may be associated with a higher threshold or tolerance, for example. To this end, different questions may be associated with different expected frequencies or expected frequency responses. In other words, one or more segments associated with a high frequency response (e.g., above a frequency threshold or outside of a frequency range) of multiple segments or a plurality of segments may not necessarily be indicative of a fraudster. The analysis component 250 may utilize context information to facilitate determining whether or not a response or a voice signal is potentially fraudulent or associated with potential fraudulent activity. In yet another example, an account owner may submit a voice sample for positive identification to verify his or her identity when individuals claiming to be the account owner call in.

The analysis component 250 may determine risks associated with a transaction or a request (e.g., address change, money transfer, etc.) and determine thresholds or tolerances for VSA according to or based on one or more of the risks. In one or more embodiments, the analysis component 250 may order one or more security questions or 'test' questions such that a security question, stress question, or 'test' question is asked first or before a baseline question, conversational question, goal, desires, etc. For example, a communication may be structured such that a verification segment may occur prior to a conversation segment. In other words, the analysis component enables implementation of VSA such that a structured format for the questioning is not required. For example, test questions and baseline questions may be asked in most any order. A caller or individual may provide a communication or statement without a prompt from a representative, such as at the beginning of a call, for example.

Additionally, the analysis component 250 may be utilized to check for false positives related to other aspects of the system 200. For example, it may not be possible to rely merely on voice biometrics (e.g., the monitoring component 230) or merely on pathway detection (e.g., the detection component 240) because a large amount of spoofing occurs. The spoofing may be intentional or it may be unintentional. For example, when an individual calls in from a voice over internet protocol (VoIP) platform, degradation of the quality of the communication may occur, thereby causing call quality issues, volume issues, etc. To this end, when audio is impacted (e.g., due to connectivity issues), a higher occurrence false positives may arise. Because issues which impact voice biometrics may not have as large an impact on voice stress, VSA may be utilized to cross reference results of the voice biometrics. For example, the vibration rate associated with a voice signature or voice signature generally does not change as call quality varies. Accordingly, the analysis component 250 may provide a level of confidence as to whether or not a caller or individual is a fraudster.

In one or more embodiments, the database component 220. The database component may include one or more libraries. For example, the database component 220 may include a voice library, a pathway library, and a frequency library. The voice library (e.g., fraud voice library or voice print database) may include voice samples, voice signals, audio signatures, etc. of individuals deemed to be fraudsters, impersonators, or perpetrators. This enables a comparison to be made between a voice signal of an inbound caller or inbound communication and voice samples of one or more of the known fraudsters. When a match is found, actions may be taken to mitigate loss or an account takeover, for example.

In one or more embodiments, the voice library or voice print database may include voice signals for one or more owners or authorized users for one or more corresponding accounts. In other words, the voice print library may include voice signals or voice prints which may be utilized for positive identification of an individual when that individual is in communication with a call center. For example, a voice print of a voice signal of an owner or authorized user of an account may be made or recorded when the account is opened or when an account owner is present in person, etc. In this way, the voice signal or voice print associated with the account may be a voice known to be associated with the account owner, thereby enabling the voice print to be utilized for positive identification use. Such identification may be applied live or to recorded calls. It will be appreciated that other components, such as the monitoring component 230, may isolate one or more of the voice signals for a live communication or a recorded communication.

The database component 220 may include a pathway library or pathway database which stores one or more known fraud pathways or sets of characteristics associated with pathways which are deemed to be associated with fraudulent activity. In other words, a pathway library may include one or more sets of characteristics deemed to be associated with fraudulent communication.

Additionally, the database component 220 may include a frequency library. The frequency library may include characteristics associated with account owners. For example, the frequency library may be utilized to compile patterns associated with account owners (e.g., an account owners generally calls in from a same or similar call pathway, has a voice signal associated with a frequency range, calls in at a particular time, etc.). In this way, a database of people who call in per account may be built and comparisons may be made accordingly. It will be appreciated the one or more of the libraries may be modified or updated based on input, a result, or a determination generated based on one or more of the other libraries. In other words, when fraud occurs, an associated voice signal may be recorded to a voice library, attributes or characteristics stored for a communication pathway to a pathway library. To this end most any data associated with activity deemed fraudulent may be captures or loaded back into an appropriate or corresponding library. In this way, one of the libraries may be utilized to sharpen or enhance the other two.

In one or more embodiments, the fraud component 260 may identify potential fraudulent activity or types of fraudulent activity and provide one or more notifications to one or more parties when potential fraudulent activity is detected. In one or more embodiments, the fraud component 260 may select or determine one or more responses to the potential fraudulent activity (e.g., open an investigation, notify one or more parties, entities, individuals, etc.). Potential fraudulent activity may be mitigated by intervening, providing one or more notifications to one or more parties when potential fraudulent activity is identified, etc. Fraudulent activity or potential fraudulent activity may be identified by the fraud component 260 based on one or more determinations, such as the voice match determination, the pathway match determination, or the frequency determination. It will be appreciated that intervening activity may be conducted live or after the fact, such as when analysis is applied to a recorded communication or after a call has come to a natural conclusion.

In one or more embodiments, fraudulent activity may be found or determined based on a comparison between a voice signal and a voice print database (e.g., to detect when individuals deemed to be fraudsters in communication), spoof detection, pathway detection, a comparison between a communication pathway and a pathway library or pathway database (e.g., to detect when communications are originating from a known fraud pathway), voice stress analysis (VSA), stress segment to non-stress segment ratio (e.g., for one or more portions or segments of a communication). The fraud component 260 may compare voice signals or voice signatures received from the monitoring component against voice samples or voice signatures from the database component 220.

The fraud component 250 may determine fraudulent activity based on one or more determinations (e.g., the voice match determination, the pathway match determination, or the frequency determination). For example, the fraud component 260 may deem activity associated with an account to be fraudulent based on a comparison between one or more of the voice signals and one or more of the voice samples of the voice library. The fraud component 260 may also deem activity associated with the account to be fraudulent based on a comparison between one or more of the characteristics associated with the communication and one or more sets of the characteristics of the pathway library. In one or more embodiments, the fraud component 260 may deem activity to be fraudulent based on VSA performed by the analysis component 250 where a voice signal exceeds a frequency response threshold or frequency range.

The fraud component 260 may update one or more libraries of the database component 220. For example, the fraud component 260 may update the voice library or the pathway library based on activity deemed to be fraudulent associated with the account. It will be appreciated the one or more of the libraries may be utilized to sharpen, enhance, or cross reference the other libraries. The activity deemed to be fraudulent for the account may be determined at a time after the communication has occurred. In some scenarios, the activity deemed to be fraudulent may be discovered, marked, or tagged manually.

To this end the fraud component 260 may update a frequency library with one or more of the frequency responses associated with the individual, update the voice library with one or more of the voice signals based on a match between one or more of the characteristics associated with the communication and one or more sets of the characteristics of the pathway library, update the voice library with one or more of the voice signals based on one or more frequency responses of one or more of the voice signals of the communication, update the pathway library with one or more characteristics of the communication based on a match between one or more of the voice signals and one or more of the voice samples of the voice library, or update the pathway library with one or more characteristics of the communication based on one or more frequency responses of one or more of the voice signals of the communication.

As an example, when potential or actual fraudulent activity is detected, the fraud component 260 may identify one or more signatures associated with the potential or actual fraudulent activity and update the database component accordingly. For example, if the analysis component 250 detects that an individual is responding in a manner which is not consistent with characteristics of a legitimate individual, legitimate caller, or legitimate account owner, the fraud component 260 may record one or more portions of the conversation and store them with the database component 220 for future reference. This way, if the same individual initiates additional communication with a call center or other aspect of an institution, voice biometrics, a voice print or voice comparison may be conducted to identify the individual as a known fraudster or known perpetrator.

In one or more embodiments, the database 220 or associated libraries may be updated after an extended period of time has passed. For example, to facilitate maintenance of one or more of the databases or libraries, when fraud is detected, an investigation may be opened to determine whether or not one or more communications on the record exist. In this way, old or previously recorded voice signals, communications, calls, etc. may be analyzed even when no potential fraud is detected at the time of the communication, for example.

In one or more embodiments, the system 200 of FIG. 2 may analyze one or more segments of a communication for stress where little or no stress should occur or be expected. Additionally, the fraud component 260 may identify potential fraudulent activity by weighing the voice match determination heavier than the frequency determination. The fraud component 260 may identify potential fraudulent activity by considering the voice match determination prior to considering the frequency determination as well.

It will be appreciated that one or more the systems or techniques, such as VSA, communication pathways, or voice prints may be applied to live communication or recorded communication. For example, VSA may be applied to inbound communications or phone calls to a bank or a call center. In one or more embodiments, one or more aspects may be implemented in an interactive voice response (IVR) system. Here, a communication may include one or more segments having one or more voice signals associated with merely one individual. A communication may implemented or may occur over a voice over internet protocol (VoIP) channel. For example, a recorded communication may be a telecommunication in which the individual is a participant. The analysis component 250 may execute voice stress analysis live during a communication or at a later time for a recorded communication. If voice biometrics matches a voice signal to a known fraud voice print, VSA may not be utilized by the analysis component 250. VSA may be utilized when a communication is associated with a VoIP channel or when a new or unknown voice print is detected or when an unknown voice signature and a new or unknown communication pathway.

Figure 3:
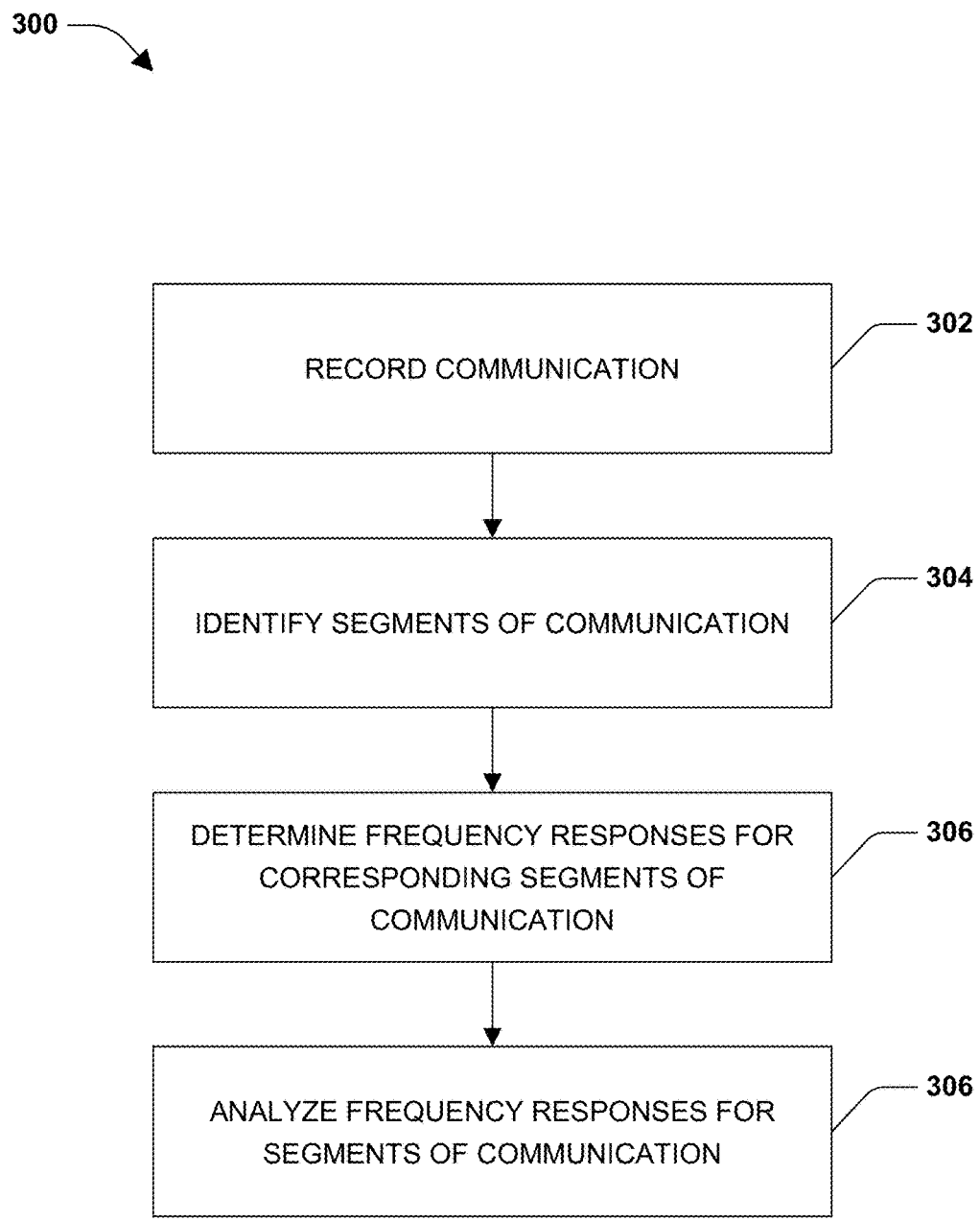
FIG. 3 is an illustration of an example flow diagram of a method for fraud detection, according to one or more embodiments.

FIG. 3 is an illustration of an example flow diagram of a method 300 for fraud detection, according to one or more embodiments. At 302, a communication may be received or recorded. At 304, one or more segments of the communication may be identified or tagged. At 306, one or more frequency responses may be determined for one or more segments of the communication. At 306, one or more frequency responses may be analyzed for one or more segments of the communication (e.g., by comparing two or more frequency responses for two or more segments of a communication or by comparing a frequency response of a segment with a threshold or range).

Figure 4:
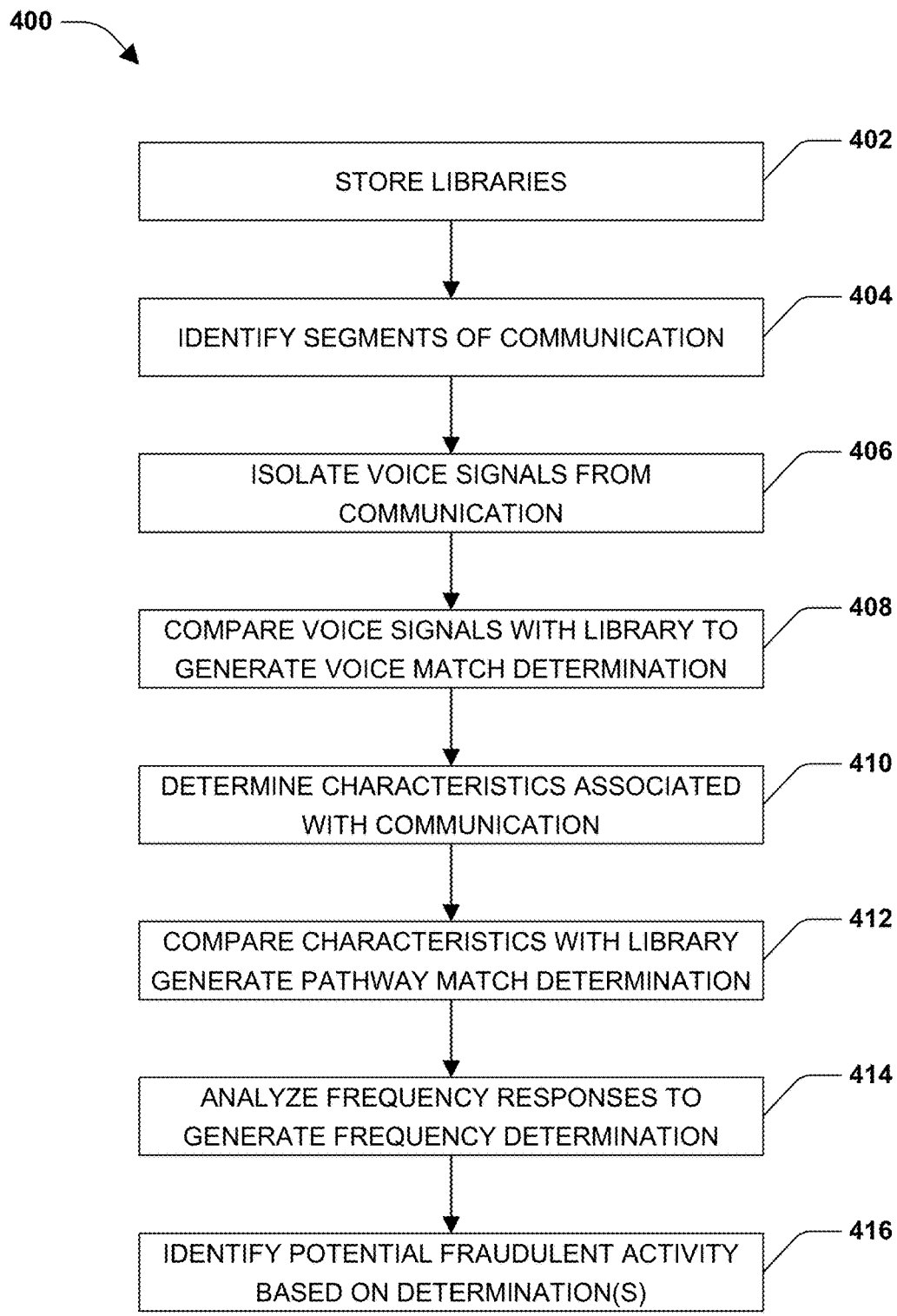
FIG. 4 is an illustration of an example flow diagram of a method for fraud detection, according to one or more embodiments.

FIG. 4 is an illustration of an example flow diagram of a method 400 for fraud detection, according to one or more embodiments. At 402, one or more libraries are built. At 404, one or more segments of a communication are identified. At 406, one or more voice signals may be isolated from a communication. At 408, one or more voice signals may be compared against a voice library to generate a voice match determination. At 410, one or more characteristics associated with a communication may be determined. At 412, one or more of the characteristics may be compared against characteristics from a pathway library to generate a pathway match determination. At 414, one or more frequency responses may be analyzed to generate a frequency determination. At 416, potential fraudulent activity may be identified based on one or more of the determinations.

Figure 5:
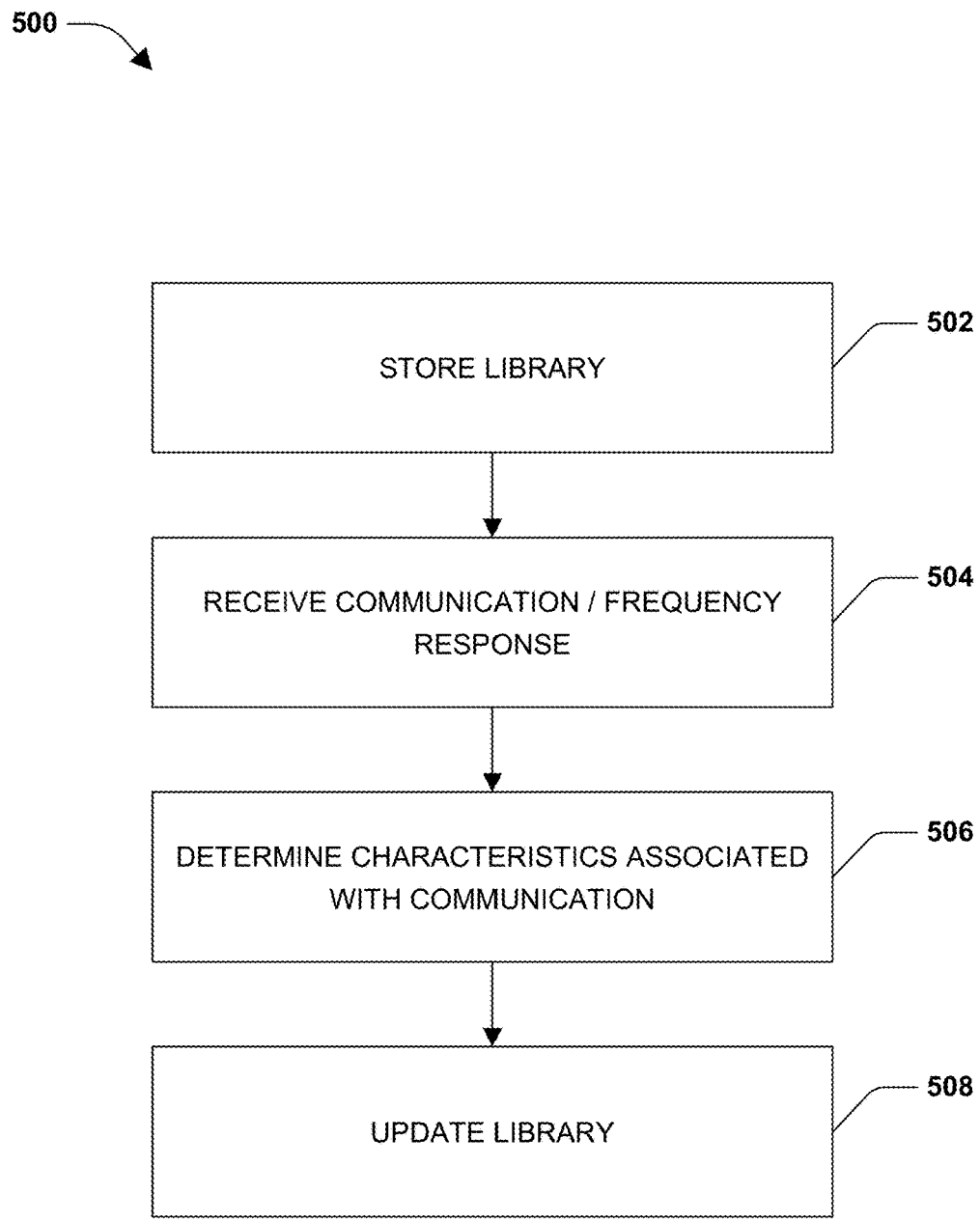
FIG. 5 is an illustration of an example flow diagram of a method for fraud detection, according to one or more embodiments.

FIG. 5 is an illustration of an example flow diagram of a method 500 for fraud detection, according to one or more embodiments. One or more libraries may be generated or stored at 502. A communication may be received and frequency responses determined at 504. One or more characteristics associated with the communication may be determined at 506. At 508, one or more libraries may be updated based on one or more of the frequency responses (e.g., VSA) or characteristics (e.g. pathway characteristics).

Figure 6:
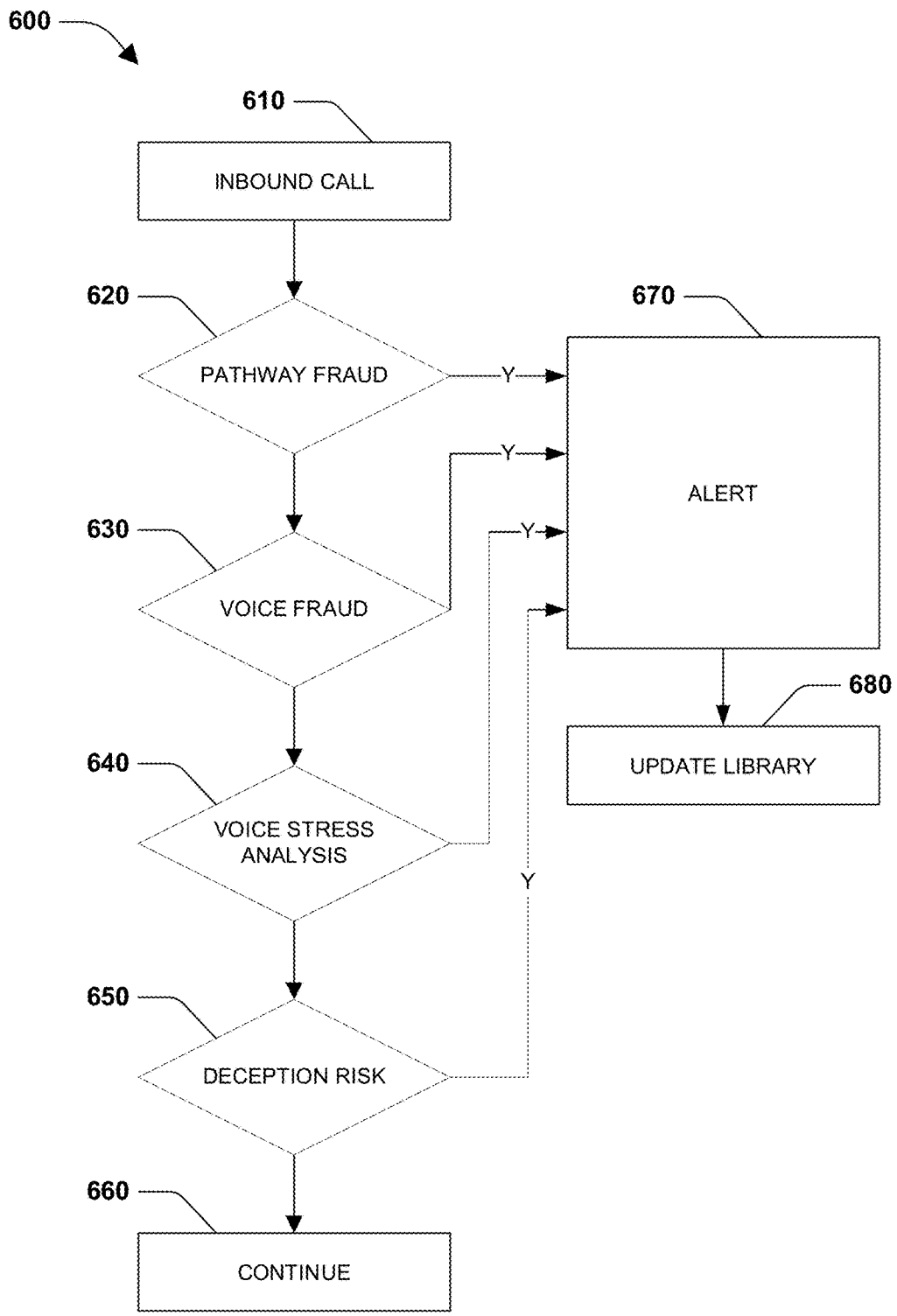
FIG. 6 is an illustration of an example flow diagram of a method for fraud detection, according to one or more embodiments.

FIG. 6 is an illustration of an example flow diagram of a method 600 for fraud detection, according to one or more embodiments. At 610, an inbound call may be received. At 620, pathway fraud detection may be employed (e.g., characteristics compared against a pathway library). At 630, voice signals may be compared against a voice library. At 640, VSA may be implemented. At 650, the risk of deception may be analyzed. If fraud is detected at 620, 630, 640, or 650, an alert 670 may be sent and one or more libraries 680 updated. If no fraud is detected, the call may proceed 660.

Figure 7:
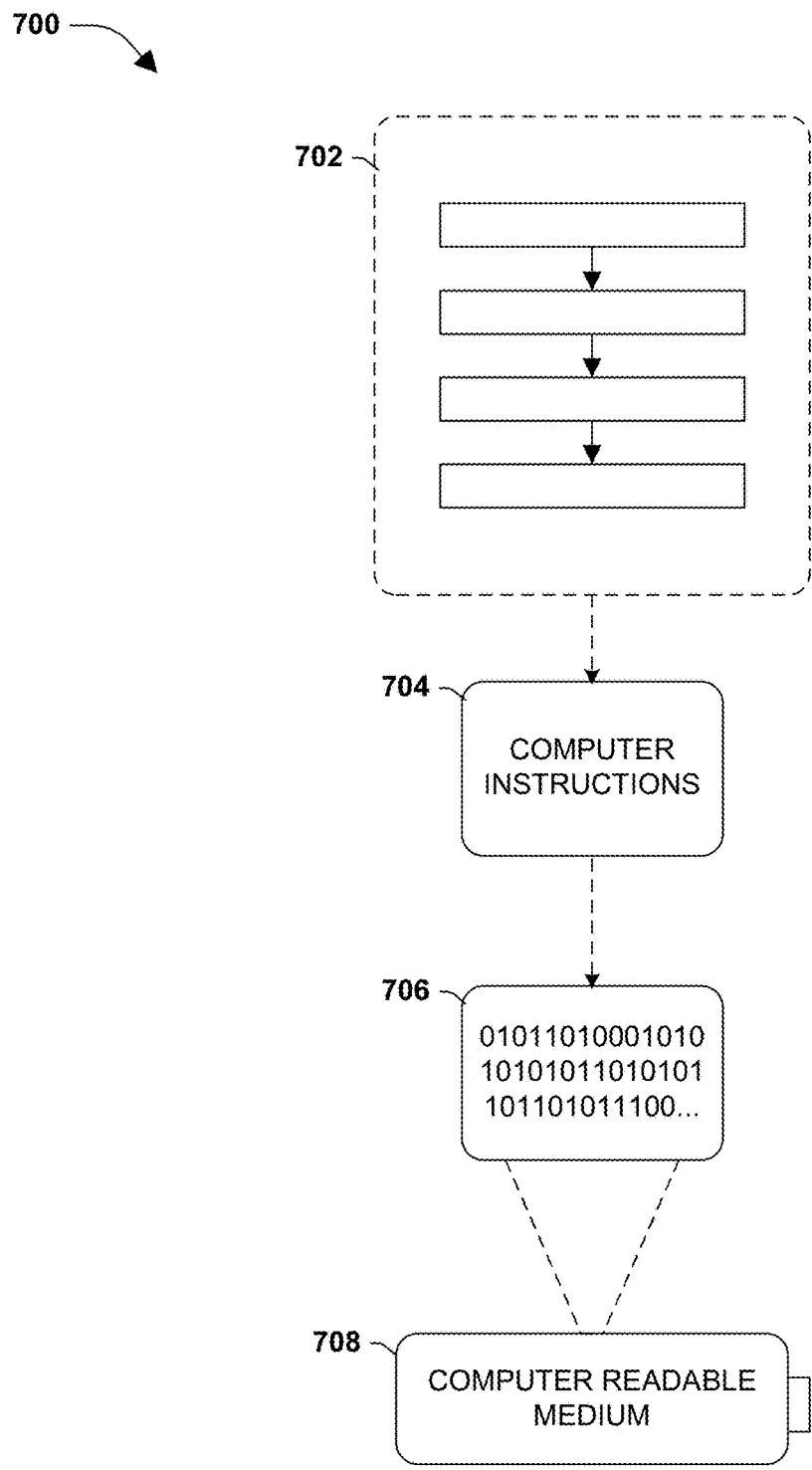
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 are configured to perform a method 702, such as the method 300 of FIG. 3, the method 400 of FIG. 4, etc. In another embodiment, the processor-executable instructions 704 are configured to implement a system, such as the system 200 of FIG. 2. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices.

According to one or more aspects, system for fraud detection is provided, including a monitoring component recording a communication, wherein the communication includes one or more segments of one or more voice signals associated with an individual and identifying one or more of the segments of the communication. The system may include an analysis component determining one or more frequency responses for one or more of the corresponding segments of the communication and analyzing one or more of the frequency responses for one or more of the segments of the communication.

In one or more embodiments, the communication includes a salutation segment, a verification segment, a conversation segment, or a summary segment. The salutation segment may include an introduction, a customary greeting, or identification. The verification segment may include one or more security questions, one or more test questions, or one or more stress questions. The conversation segment may include one or more requests associated with an account. The communication may be implemented across a voice over internet protocol (VoIP) channel. In one or more embodiments, analysis component may compare two or more of the frequency responses for two or more of the segments of the communication. The analysis component may compare two or more of the frequency responses based on a delta frequency threshold. The analysis component may analyze one or more of the frequency responses based on voice stress analysis (VSA). The communication may include one or more segments of one or more additional voice signals associated with a second individual (e.g., a representative).

According to one or more aspects, a method for fraud detection is provided, including recording a communication, wherein the communication includes one or more segments having one or more voice signals associated with an individual, identifying one or more of the segments of the communication, determining one or more frequency responses for one or more of the corresponding segments of the communication, and analyzing one or more of the frequency responses for one or more of the segments of the communication.

In one or more embodiments, the method may include comparing two or more of the frequency responses for two or more of the segments of the communication. The method may include comparing two or more of the frequency responses is based on a delta frequency threshold, analyzing one or more of the frequency responses based on voice stress analysis (VSA). The communication may include one or more segments of one or more additional voice signals associated with a second individual. The communication may be a recorded communication or a telecommunication in which the individual is a participant.

According to one or more aspects, system for fraud detection is provided, including a database component including a voice library including one or more voice samples of individuals deemed to be fraudsters. The system may include a monitoring component identifying one or more segments of a communication as a salutation segment, a verification segment, a conversation segment, or a summary segment. The monitoring component may isolate one or more voice signals from one or more of the segments of the communication. The monitoring component may compare one or more of the voice signals from one or more of the segments of the communication with one or more of the voice samples of the voice library to generate a voice match determination. The system may include an analysis component analyzing one or more frequency responses of one or more of the voice signals from one or more of the segments of the communication to generate a frequency determination. The system may include a fraud component identifying potential fraudulent activity based on the voice match determination or the frequency determination.

In one or more embodiments, the fraud component identifies potential fraudulent activity by weighing the voice match determination heavier than the frequency determination. The fraud component may identify potential fraudulent activity by considering the voice match determination prior to considering the frequency determination. The monitoring component may filter noise from one or more of the segments of the communication. The analysis component may generate the frequency determination based on a comparison between one or more of the frequency responses and a frequency threshold. The analysis component may generate the frequency determination based on a comparison between one or more of the frequency responses of one or more of the segments of the communication and one or more other frequency responses of one or more other segments of the communication.

In one or more embodiments, the fraud component provides one or more notifications to one or more parties when potential fraudulent activity is identified. The monitoring component may isolate one or more of the voice signals for a live communication or a recorded communication. One or more of the voice signals may be from an individual. One or more of the voice signals or other voice signals may be from a representative of a call center.

According to one or more aspects, system for fraud detection is provided, including a database component which includes a pathway library including one or more sets of characteristics deemed to be associated with fraudulent communication. The system may include a monitoring component identifying one or more segments of a communication as a salutation segment, a verification segment, a conversation segment, or a summary segment. The monitoring component may isolate one or more voice signals from one or more of the segments of the communication. The system may include a detection component determining one or more characteristics associated with the communication. The detection component may compare one or more of the characteristics associated with the communication with one or more of the sets of characteristics of the pathway library to generate a pathway match determination. The system may include an analysis component analyzing one or more frequency responses of one or more of the voice signals from one or more of the segments of the communication to generate a frequency determination. The system may include a fraud component identifying potential fraudulent activity based on the pathway match determination or the frequency determination.

In one or more embodiments, one or more of the characteristics associated with the communication may be indicative of a technology associated with the communication, one or more artifacts associated with the communication, or noise associated with the communication. The communication may occur over a voice over internet protocol (VoIP) channel or a telecommunications channel. The analysis component may utilize one or more of the voice signals from the salutation segment or conversation segment as a baseline for generating the frequency determination.

According to one or more aspects, a system for fraud detection is provided, including a database component, a monitoring component, a detection component, an analysis component, and a fraud component. The database component may include a voice library including one or more voice samples of individuals deemed to be fraudsters. The database component may include a pathway library including one or more sets of characteristics deemed to be associated with fraudulent communication. The monitoring component may identify one or more segments of a communication as a salutation segment, a verification segment, a conversation segment, or a summary segment. The monitoring component may isolate one or more voice signals from one or more of the segments of the communication. The monitoring component may compare one or more of the voice signals from one or more of the segments of the communication with one or more of the voice samples of the voice library to generate a voice match determination. The detection component may determine one or more characteristics associated with the communication. The detection component may compare one or more of the characteristics associated with the communication with one or more of the sets of characteristics of the pathway library to generate a pathway match determination. The analysis component may analyze one or more frequency responses of one or more of the voice signals from one or more of the segments of the communication to generate a frequency determination. The fraud component may identify potential fraudulent activity based on the voice match determination, the pathway match determination, or the frequency determination.

In one or more embodiments, the fraud component may identify potential fraudulent activity by weighing the voice match determination heavier than the frequency determination or by considering the voice match determination prior to considering the frequency determination. The monitoring component may filter noise from one or more segments of the communication.

According to one or more aspects, system for fraud detection is provided, including a database component, a monitoring component, a detection component, and a fraud component. The database component may include a voice library including one or more voice samples of individuals deemed to be fraudsters. The database component may include a pathway library including one or more sets of characteristics deemed to be associated with fraudulent communication. The monitoring component may receive a communication, wherein the communication includes one or more voice signals of an individual making one or more requests associated with an account. The detection component may determine one or more characteristics associated with the communication. The fraud component may update the voice library or the pathway library based on activity deemed to be fraudulent associated with the account.

In one or more embodiments, the system includes an analysis component determining one or more frequency responses of one or more of the voice signals of the communication. The fraud component may update a frequency library with one or more of the frequency responses associated with the individual. The fraud component may deem activity associated with the account to be fraudulent based on a comparison between one or more of the voice signals and one or more of the voice samples of the voice library. The fraud component may deem activity associated with the account to be fraudulent based on a comparison between one or more of the characteristics associated with the communication and one or more sets of the characteristics of the pathway library. In one or more embodiments, the activity deemed to be fraudulent for the account may be determined at a time after the communication has occurred. For example, the activity deemed to be fraudulent may be discovered manually.

According to one or more aspects, a method for fraud detection is provided, including storing a voice library including one or more voice samples of individuals deemed to be fraudsters, storing a pathway library including one or more sets of characteristics deemed to be associated with fraudulent communication, receiving a communication, wherein the communication includes one or more voice signals of an individual making one or more requests associated with an account, determining one or more characteristics associated with the communication, or updating the voice library or the pathway library based on activity deemed to be fraudulent associated with the account.

The method may include determining one or more frequency responses of one or more of the voice signals of the communication, updating a frequency library with one or more of the frequency responses associated with the individual, deeming activity associated with the account to be fraudulent based on a match between one or more of the voice signals and one or more of the voice samples of the voice library, or deeming activity associated with the account to be fraudulent based on a match between one or more of the characteristics associated with the communication and one or more sets of the characteristics of the pathway library.

According to one or more aspects, a system for fraud detection is provided, including database component, a monitoring component, a detection component, and a fraud component. The database component may include a voice library including one or more voice samples of individuals deemed to be fraudsters and a pathway library including one or more sets of characteristics deemed to be associated with fraudulent communication. The monitoring component may receive a communication, wherein the communication includes one or more voice signals of an individual making one or more requests associated with an account, wherein the communication is recorded. The detection component may determine one or more characteristics associated with the communication. The fraud component may update the voice library or the pathway library based on activity deemed to be fraudulent associated with the account.

The fraud component may update the voice library with one or more of the voice signals based on a match between one or more of the characteristics associated with the communication and one or more sets of the characteristics of the pathway library, update the voice library with one or more of the voice signals based on one or more frequency responses of one or more of the voice signals of the communication, update the pathway library with one or more characteristics of the communication based on a match between one or more of the voice signals and one or more of the voice samples of the voice library, or update the pathway library with one or more characteristics of the communication based on one or more frequency responses of one or more of the voice signals of the communication.

In one or more embodiments, the system may include an analysis component determining one or more frequency responses of one or more of the voice signals of the communication. The fraud component may update a frequency library with one or more of the frequency responses associated with the individual. The monitoring component may filter noise from one or more segments of the communication.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for fraud detection, comprising:
    a database component comprising:
        a voice library comprising one or more voice samples of individuals deemed to be fraudsters; and
        a pathway library comprising one or more sets of characteristics deemed to be associated with fraudulent communication;
    a monitoring component receiving a communication, wherein the communication comprises one or more voice signals of an individual making one or more requests associated with an account;
    a detection component determining one or more characteristics associated with the communication;
    a fraud component updating the voice library or the pathway library based on activity deemed to be fraudulent associated with the account;
    an analysis component determining one or more frequency responses of one or more of the voice signals of the communication
    wherein the monitoring component is operative to generate a voice match determination based on a comparison between one or more of the voice signals of the communication and one or more voice signals or voice samples from the voice library,
    wherein the fraud component is operative to identify potential fraudulent activity by weighing the voice match determination more heavily than the frequency determination,
    wherein the database component, the monitoring component, the detection component, or the fraud component is implemented via a processing unit.

2. The system of claim 1, comprising an analysis component determining one or more frequency responses of one or more of the voice signals of the communication.

3. The system of claim 2, wherein the fraud component updates a frequency library with one or more of the frequency responses associated with the individual.

4. The system of claim 1, wherein the fraud component deems activity associated with the account to be fraudulent based on a comparison between one or more of the voice signals and one or more of the voice samples of the voice library.

5. The system of claim 1, wherein the fraud component deems activity associated with the account to be fraudulent based on a comparison between one or more of the characteristics associated with the communication and one or more sets of the characteristics of the pathway library.

6. The system of claim 1, wherein the activity deemed to be fraudulent for the account is determined at a time after the communication has occurred.

7. The system of claim 1, wherein the activity deemed to be fraudulent is discovered manually.

8. A method for fraud detection, comprising:
    storing:
        a voice library comprising one or more voice samples of individuals deemed to be fraudsters,
        a pathway library comprising one or more sets of characteristics deemed to be associated with fraudulent communication, and
        a frequency library which includes characteristics associated with account owners,
    receiving a communication, wherein the communication comprises one or more voice signals of an individual making one or more requests associated with an account;
    determining one or more characteristics associated with the communication; and
    updating the voice library or the pathway library based on activity deemed to be fraudulent associated with the account;
    determining one or more frequency responses of one or more voice signals of the communication;
    generating a voice match determination based on a comparison between one or more of the voice signals of the communication and one or more voice signals or voice samples from the voice library;
    identifying potential fraudulent activity by weighing the voice match determination more heavily than the frequency determination;

wherein the frequency library is utilized to compile patterns associated with account owners, wherein the storing, the receiving, the determining, the generating, the identifying or the updating is implemented via a processing unit.

9. The method of claim 8, comprising updating a frequency library with one or more of the frequency responses associated with the individual.

10. The method of claim 8, comprising deeming activity associated with the account to be fraudulent based on a match between one or more of the voice signals and one or more of the voice samples of the voice library.

11. The method of claim 8, comprising deeming activity associated with the account to be fraudulent based on a match between one or more of the characteristics associated with the communication and one or more sets of the characteristics of the pathway library.

12. A system for fraud detection, comprising:
   a database component comprising:
      a voice library comprising one or more voice samples of individuals deemed to be fraudsters; and
      a pathway library comprising one or more sets of characteristics deemed to be associated with fraudulent communication;
   a monitoring component receiving a communication, wherein the communication comprises one or more voice signals of an individual making one or more requests associated with an account, wherein the communication is recorded, wherein the monitoring component is operative to generate a voice match determination based on a comparison between one or more of the voice signals of the communication and one or more voice signals or voice samples from the voice library;
   a detection component determining one or more characteristics associated with the communication, utilizing one or more characteristics associated with the communication to generate reverse lookup data or reverse path data for the communication in order to identify information indicative of the technology, artifacts, or noise associated with the communication;
   an analysis component determining one or more frequency responses of one or more of the voice signals of the communication; and
   a fraud component updating the voice library or the pathway library based on activity deemed to be fraudulent associated with the account, wherein the fraud component is operative to identify potential fraudulent activity by weighing the voice match determination more heavily than the frequency determination,
   wherein the database component, the monitoring component, the detection component, the analysis component or the fraud component is implemented via a processing unit.

13. The system of claim 12, wherein the fraud component updates the voice library with one or more of the voice signals based on a match between one or more of the characteristics associated with the communication and one or more sets of the characteristics of the pathway library.

14. The system of claim 12, wherein the fraud component updates the voice library with one or more of the voice signals based on one or more frequency responses of one or more of the voice signals of the communication.

15. The system of claim 12, wherein the fraud component updates the pathway library with one or more characteristics of the communication based on a match between one or more of the voice signals and one or more of the voice samples of the voice library.

16. The system of claim 12, wherein the fraud component updates the pathway library with one or more characteristics of the communication based on one or more frequency responses of one or more of the voice signals of the communication.

17. The system of claim 12, wherein the fraud component updates a frequency library with one or more of the frequency responses associated with the individual.

18. The system of claim 12, monitoring component filters noise from one or more segments of the communication.

* * * * *